US012789502B2

(12) United States Patent
Hisamatsu et al.

(10) Patent No.: US 12,789,502 B2
(45) Date of Patent: Nov. 10, 2026

(54) CORE MEMBER

(71) Applicant: JSP CORPORATION, Tokyo (JP)

(72) Inventors: Katsunori Hisamatsu, Utsunomiya (JP); Keiichi Hashimoto, Utsunomiya (JP)

(73) Assignee: JSP CORPORATION, Tokyo (JP)

( * ) Notice: Subject to any disclaimer, the term of this patent is extended or adjusted under 35 U.S.C. 154(b) by 194 days.

(21) Appl. No.: 18/285,420

(22) PCT Filed: Mar. 29, 2022

(86) PCT No.: PCT/JP2022/015740
§ 371 (c)(1),
(2) Date: Oct. 3, 2023

(87) PCT Pub. No.: WO2022/215607
PCT Pub. Date: Oct. 13, 2022

(65) Prior Publication Data

US 2024/0109271 A1 Apr. 4, 2024

(30) Foreign Application Priority Data

Apr. 9, 2021 (JP) ................................ 2021-066701

(51) Int. Cl.
*B32B 5/18* (2006.01)
*A47C 27/15* (2006.01)
(Continued)

(52) U.S. Cl.
CPC .............. *B32B 5/18* (2013.01); *B32B 27/065* (2013.01); *B32B 27/32* (2013.01); *B32B 27/40* (2013.01);
(Continued)

(58) Field of Classification Search
CPC ... A47C 27/15; B29C 44/3426; B29C 44/445; B29C 67/205; B29K 2075/00;
(Continued)

(56) References Cited

U.S. PATENT DOCUMENTS

2018/0022886 A1* 1/2018 Oikawa .................... C08J 9/122 521/134
2018/0319304 A1 11/2018 Takayama et al.
(Continued)

FOREIGN PATENT DOCUMENTS

EP 3581613 A1 12/2019
JP 2015-143046 A 8/2015
(Continued)

OTHER PUBLICATIONS

Jun. 14, 2022 International Search Report issued in International Patent Application No. PCT/JP2022/015740.
(Continued)

*Primary Examiner* — Hai Vo
(74) *Attorney, Agent, or Firm* — Oliff PLC

(57) ABSTRACT

A core member used for a laminate in which polyurethane foam is laminated on the core member made of a thermoplastic resin expanded beads molded article, such that the molded article in which expanded beads having through holes are mutually fused, an average porosity of the expanded beads molded article is between 10% and 25%, and on a surface of the expanded beads molded article, a ratio of a total opening area of the through hole portions of the expanded beads to a surface area of the expanded beads molded article is between 2% and 5%, an average opening area of the through hole portions of the expanded beads is between 5 $mm^2$ and 20 $mm^2$, and the ratio of the number of
(Continued)

through hole portions having an opening area of 2 $mm^2$ or more to the number of through hole portions of the expanded beads is 60% or less.

6 Claims, 5 Drawing Sheets

(51) Int. Cl.

| | |
|---|---|
| ***B32B 27/06*** | (2006.01) |
| ***B32B 27/32*** | (2006.01) |
| ***B32B 27/40*** | (2006.01) |
| ***B60N 3/04*** | (2006.01) |
| ***C08J 9/228*** | (2006.01) |

(52) U.S. Cl.
CPC ............... *C08J 9/228* (2013.01); *A47C 27/15* (2013.01); *B32B 2266/0278* (2013.01); *B32B 2307/546* (2013.01); *B32B 2307/72* (2013.01); *B32B 2605/003* (2013.01); *B60N 3/048* (2013.01); *C08J 2375/04* (2013.01)

(58) Field of Classification Search
CPC ...... B32B 2266/025; B32B 2266/0278; B32B 2307/546; B32B 2307/72; B32B 2535/00; B32B 2601/00; B32B 2605/003; B32B 27/065; B32B 27/32; B32B 27/40; B32B 5/18; B32B 5/32; B60N 2/6009; B60N 2/64; B60N 3/048; C08J 2201/03; C08J 2323/10; C08J 2375/04; C08J 2423/10; C08J 2475/04; C08J 9/18; C08J 9/228; C08J 9/232; C08J 9/405
See application file for complete search history.

(56) References Cited

U.S. PATENT DOCUMENTS

| | | | | |
|---|---|---|---|---|
| 2019/0014907 | A1* | 1/2019 | Hisamatsu | C08J 9/232 |
| 2019/0276627 | A1 | 9/2019 | Takagi et al. | |
| 2021/0300005 | A1 | 9/2021 | TAKAGi et al. | |

FOREIGN PATENT DOCUMENTS

| | | | |
|---|---|---|---|
| JP | 2015-155146 | A | 8/2015 |
| JP | 2017-035378 | A | 2/2017 |
| JP | 2018-080227 | A | 5/2018 |
| JP | 2019-030597 | A | 2/2019 |
| WO | 2020/031617 | A1 | 2/2020 |

OTHER PUBLICATIONS

Jun. 14, 2022 Written Opinion issued in International Patent Application No. PCT/JP2022/015740.

Feb. 20, 2025 Extended European Search Report issued in European Patent Application No. 22784591.4.

* cited by examiner

【FIG.1】
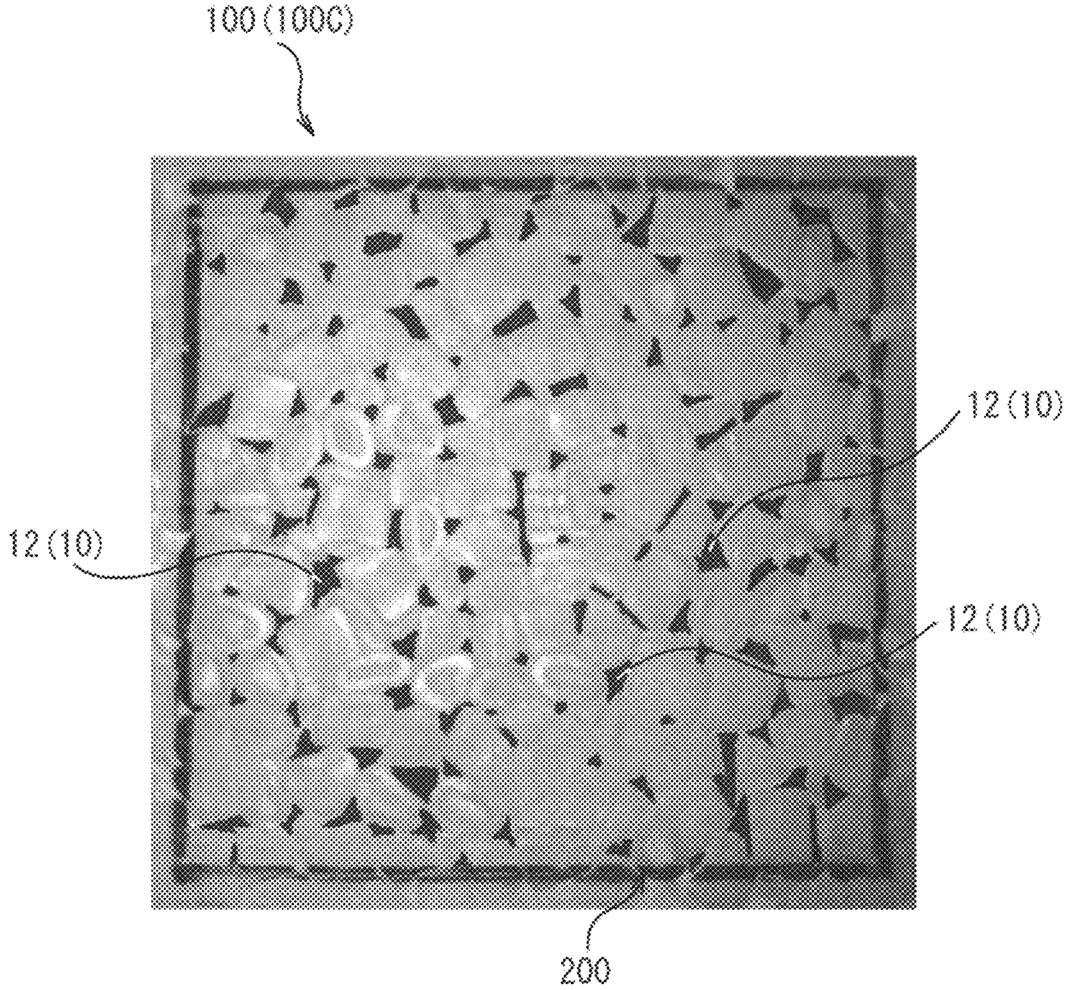

【FIG.2】
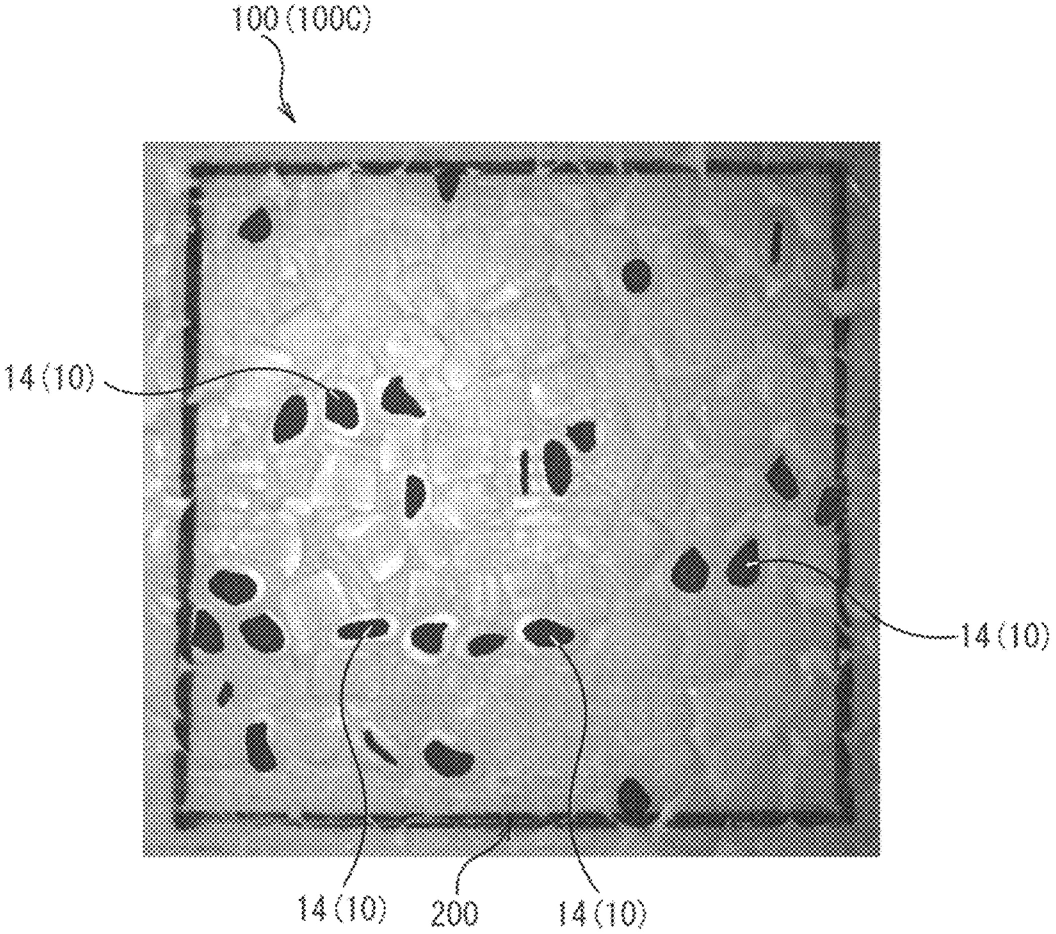

【FIG.3】
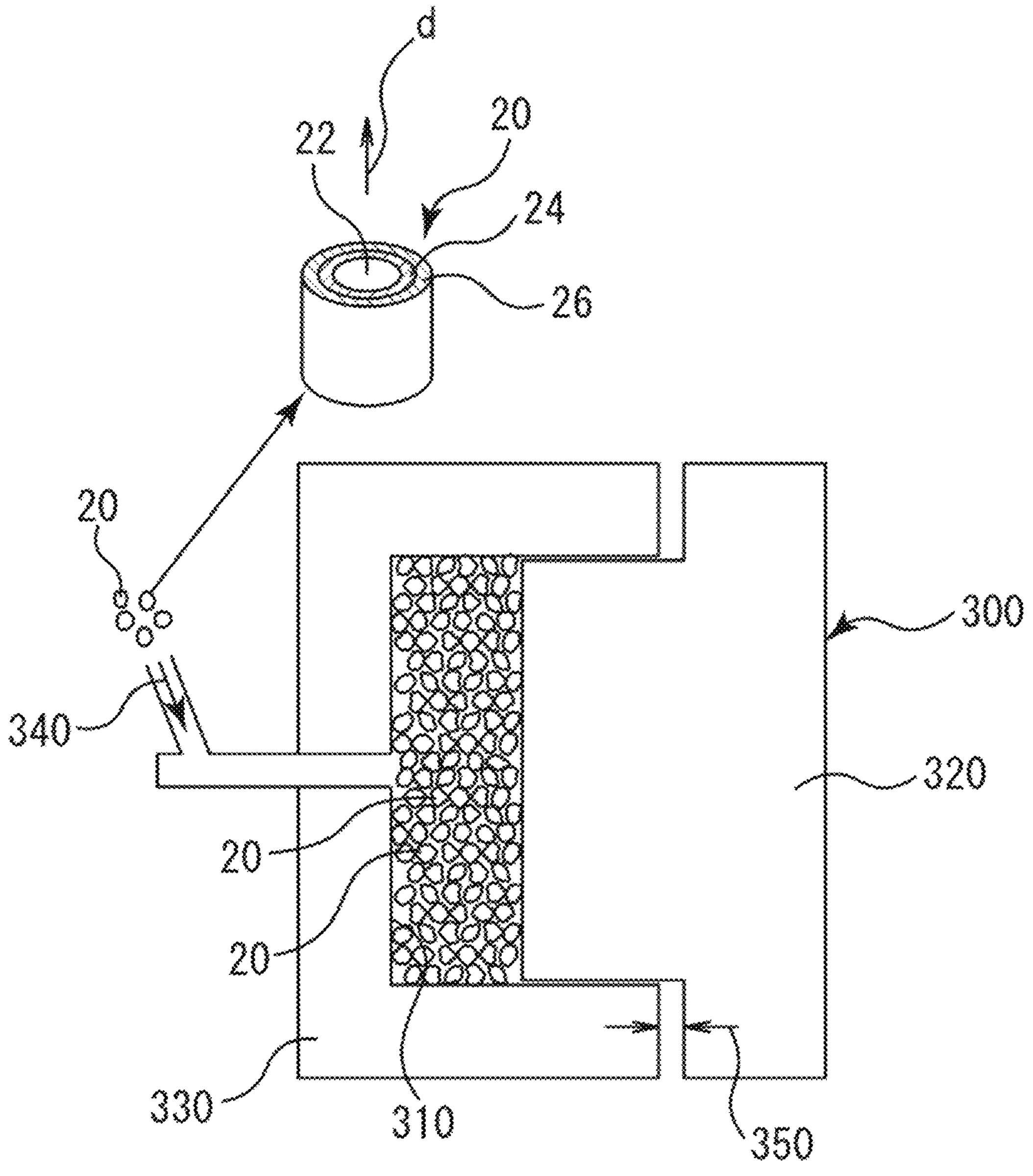

【FIG.4A】
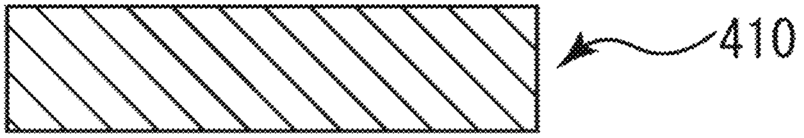
【FIG.4B】
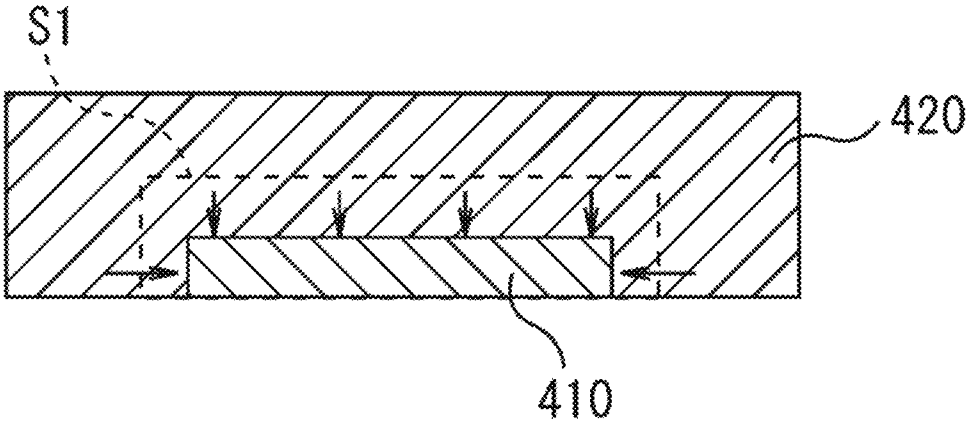

【FIG.4C】
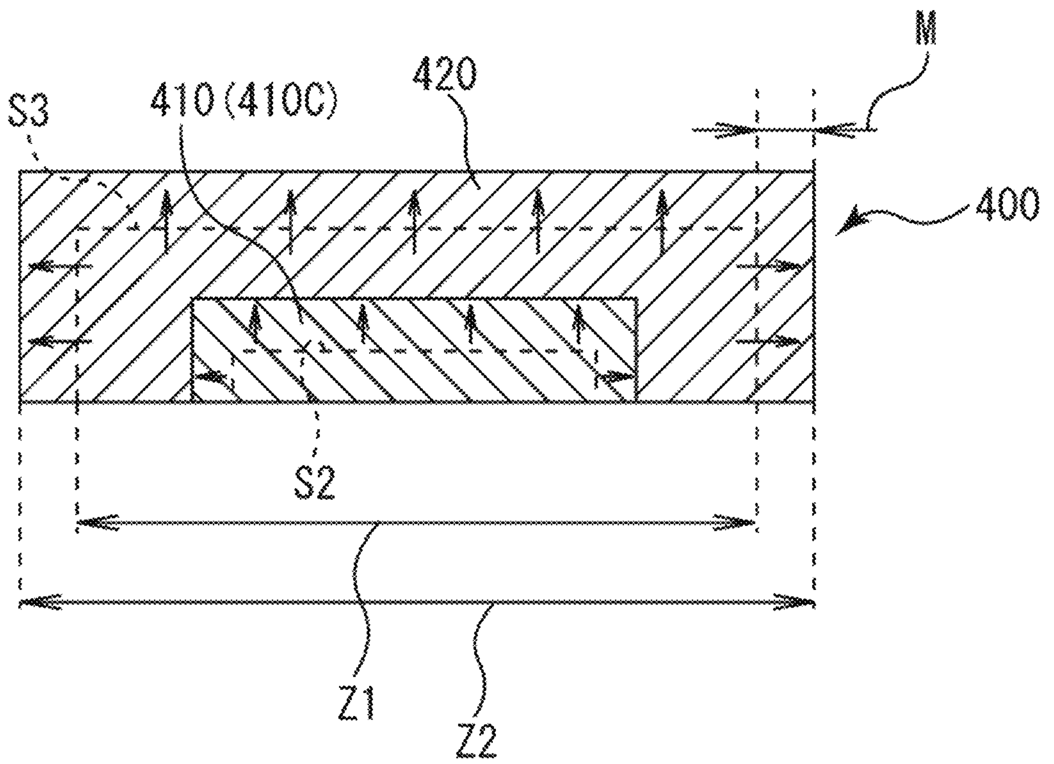

CORE MEMBER

TECHNICAL FIELD

The present invention relates to a core member used for a laminate in which polyurethane foam is laminated on the core member made of a thermoplastic resin expanded beads molded article.

BACKGROUND ART

The expanded beads molded article is used for various applications, and for example, has recently attracted attention as a material for interior parts and exterior parts of automobiles. Specifically, examples of the interior parts and the exterior parts of automobiles include a tibia pad disposed between a floor surface and a carpet of automobiles for alleviating an impact on feet of a passenger during collision or the like, a luggage box for automobiles, and a seat core member for automobiles.

In particular, in recent years, a laminate in which the polyurethane foam is laminated on a polyolefin-based resin expanded beads molded article or a thermoplastic resin expanded beads molded article has been proposed in order to exhibit composite characteristics with excellent cushioning properties and improved lightweight properties (for example, Patent Literatures 1 and 2 below). In such laminate, a urethane foam layer disposed on a surface side exhibits good cushioning properties, and the core member, being an expanded beads molded article having a relatively lower density than the polyurethane foam layer, realizes weight reduction of the laminate.

In such a laminate, adhesive strength between the core member and the polyurethane foam layer is not necessarily sufficient, and there is a problem such as a decrease in sense of use due to peeling off from each other. Therefore, in Patent Literatures 1 and 2, the expanded beads molded article used for the core member is constituted of expanded beads having through holes. Then, a part of the polyurethane foam laminated on the core member is caused to enter voids on the surface side of the expanded beads molded article made of the expanded beads and to be expanded. Techniques for sufficiently improving bonding strength between the core member and the urethane foam layer in this way are disclosed in Patent Literatures 1 and 2.

CITATION LIST

Patent Literature

Patent Literature 1: JP 2015-155146 A
Patent Literature 2: JP 2017-035378 A

SUMMARY OF INVENTION

Technical Problem

However, a laminate including a core member that is made of a conventional expanded beads molded article and a polyurethane foam layer that is laminated on the core member has the following problems.

That is, in order to respond to social demands for recent environmental problems, recycling of materials has been promoted. Material recycling generally involves disassembling one product or one part for each material of the same type and reusing each material respectively. Therefore, it is necessary to separate the core member and the polyurethane foam layer in order to reuse the laminate including the core member and the polyurethane foam layer laminated on the core member.

However, in a laminate in which the bonding strength between the expanded beads molded article and the urethane foam layer is sufficiently improved as in Patent Literatures 1 and 2, it may not be easy to separate them.

Further, it has also been confirmed that there is a new problem that, when a laminate including the core member and the polyurethane foam layer laminated on the core member is integrally molded, if the laminate is released from a mold after being integrally molded, the thermoplastic resin expanded beads molded article portion expands, and dimensional stability of the laminate becomes insufficient.

The present invention has been made in view of such a background, and an object of the present invention is, with respect to a core member used for a laminate including the core member and polyurethane foam laminated on the core member, to provide a core member that can improve the dimensional stability during production of the laminate, and be easily separated from the polyurethane foam during disassembly of the laminate.

Solution to Problem

The core member of the present invention is the core member used for a laminate in which the polyurethane foam is laminated on a core member made of a thermoplastic resin expanded beads molded article, characterized in that the thermoplastic resin expanded beads molded article is a molded article in which expanded beads having through holes are mutually fused, an average porosity of the thermoplastic resin expanded beads molded article is 10% or more and 25% or less, and on a surface of the thermoplastic resin expanded beads molded article, a ratio of a total opening area of through hole portions of the expanded beads to a surface area of the thermoplastic resin expanded beads molded article is 2% or more and 5% or less, an average opening area of through hole portions of the expanded beads is 5 $mm^2$ or more and 20 $mm^2$ or less, and, the ratio of a total number of through hole portions having an opening area of 2 $mm^2$ or more to the total number of through hole portions of the expanded beads is 60% or less.

Advantageous Effects of Invention

In a case where the core member of the present invention having the configuration described above is used as a member forming a laminate together with polyurethane foam, the dimensional stability during production of the laminate is improved, and a laminate having excellent dimensional accuracy can be provided.

In addition, in a case where the core member of the present invention forms a laminate together with the polyurethane foam, a peeling strength between the core member and the urethane foam can be suppressed to be appropriately small. Therefore, it is easy to separate the polyurethane foam and the core member during disposal. Therefore, the core member of the present invention can promote recycling of the laminate in response to the recent environmental problems.

BRIEF DESCRIPTION OF DRAWINGS

FIG. 1 is a photograph illustrating a surface of a core member according to one embodiment of the present invention.

FIG. 2 is a photograph that is the same as the photograph shown in FIG. 1, and illustrates the surface of the core member according to one embodiment of the present invention.

FIG. 3 is an explanatory drawing illustrating in-mold molding of a thermoplastic resin expanded beads molded article as a core member.

FIGS. 4A to 4C are explanatory drawings illustrating problems of a conventional laminate.

DESCRIPTION OF EMBODIMENTS

Hereinafter, the core member of the present invention will be described. Note that, in the present description, an upper limit and a lower limit of a numerical range shown stepwise with respect to one physical property, property, or the like can be arbitrarily combined.

The drawings are appropriately used for the description of the present invention.

FIG. 1 is a photograph illustrating a surface of a core member 100C according to one embodiment of the present invention, and in particular, void portions 12 of concave portions 10 observed on the surface of the core member 100C are painted black for easy visual recognition. FIG. 2 is a photograph that is the same as the photograph shown in FIG. 1, and illustrates the surface of the core member 100C, and in particular, through hole portions 14 of the concave portions 10 observed on the surface of the core member 100C are painted black for easy visual recognition.

FIG. 3 is an explanatory drawing illustrating in-mold molding of the thermoplastic resin expanded beads molded article as a core member. FIG. 3 is accompanied by an enlarged perspective view of an example of expanded beads 20 having a cross section cut in a direction orthogonal to an opening direction d of through holes 22. FIGS. 4A to 4C are explanatory drawings illustrating problems of a conventional laminate 400. FIG. 4A is a longitudinal sectional view of a thermoplastic resin expanded beads molded article 410 serving as a core member. FIG. 4B shows a state in which the thermoplastic resin expanded beads molded article 410 is set in a cavity of a molding mold to be omitted shown for forming a laminate, and a polyurethane foam raw material is fed in a remaining space of the cavity and expanded to laminate polyurethane foam 420 on the thermoplastic resin expanded beads molded article 410. FIG. 4C is a longitudinal sectional view of the laminate 400 ejected from the molding mold.

The core member 100C of the present invention is made of a thermoplastic resin expanded beads molded article 100 (hereinafter, also referred to as the expanded beads molded article 100). The expanded beads molded article 100 is a molded article formed by mutually fusing the expanded beads 20 (see FIG. 3) having the through holes 22. In the core member 100C of the present invention, polyurethane foam is laminated to form a laminate. The laminate is used as, for example, a seat core member, a seat back, a seat cushion, or the like for automobiles, and the expanded beads molded article 100 is also preferably used as a core member thereof, and more preferably used as a seat core member for automobiles. The core member 100C is made of the expanded beads molded article 100, but a wire material such as a frame material may be embedded in a part thereof.

In the present invention, the average porosity of the expanded beads molded article 100 is 10% or more and 25% or less. For example, in addition to the through hole portions 14 (see FIG. 2) of the expanded beads 20, a plurality of concave portions 10, being the void portions 12 (see FIG. 1) between adjacent expanded beads 20, are preferably formed on the surface of the expanded beads molded article 100.

On the surface of the expanded beads molded article 100 constituting the core member 100C of the present invention, the ratio of the total opening area of the through hole portions 14 to the surface area of the expanded beads molded article 100 is 2% or more and 5% or less, the average opening area of the through hole portions 14 of the expanded beads 20 is 5 $mm^2$ or more and 20 $mm^2$ or less, and, the ratio of the total number of the through hole portions 14 having an opening area of 2 $mm^2$ or more to the total number of the through hole portions 14 of the expanded beads 20 is 60% or less. Note that, the surface of the expanded beads molded article 100 refers to a surface that is scheduled to come into contact with polyurethane foam when forming a laminate unless otherwise specified.

Note that, the expanded beads 20 herein refer to expanded beads observed on the surface of the expanded beads molded article 100, in other words, expanded beads constituting the expanded beads molded article 100.

In a case where the core member 100C configured as described above is used as the core member of the laminate configured together with polyurethane foam, a dimensional change of the laminate during integral molding is favorably improved, and the core member 100C and the polyurethane foam laminated thereon are easily disassembled during disposal or the like. In other words, the present invention makes it possible to provide a laminate that includes a thermoplastic resin expanded beads molded article and polyurethane foam laminated thereon, is excellent in dimensional stability, and is also suitable for recycling.

Note that, some terms related to the present invention are defined as follows.

The concave portions 10 formed on the surface of the expanded beads molded article 100 include the through hole portions 14 formed by the expanded beads 20 having the through holes 22 and the void portions 12 formed when the plurality of expanded beads 20 are fused to each other. Specifically, the void portions 12 refer to a recess portion formed at an interface between the expanded beads 20 when the expanded beads are fused to each other. Note that, in addition to these recesses, a recess may be formed on the surface of the expanded beads molded article 100 by the shape of the mold or steam holes of the mold, but the recess by the shape of the mold or the steam holes of the mold is not included in the concave portions 10.

Further, the expanded beads molded article described with respect to the present invention refers to an expanded beads molded article in a state where a core member can be constituted. In other words, various characteristics or physical properties of the expanded beads molded article are measured using an expanded beads molded article in a state where the expanded beads molded article can be used as a core member through a step such as aging after the in-mold molding.

[Thermoplastic Resin Expanded Beads Molded Article]

The thermoplastic resin expanded beads molded article 100 constituting the core member 100C is configured by mutually fusing the expanded beads 20 having the through holes 22. In such expanded beads molded article 100, gaps derived from the through holes 22 are formed inside the expanded beads molded article 100. Further, on the surface of the expanded beads molded article 100, there are the through hole portions 14 derived from the through holes 22 exposed on the surface. Since the through hole portions 14 having a specific shape (an area in a specific range) are formed on the surface of the expanded beads molded article 100, adhesion properties with polyurethane foam that can withstand practical use is exhibited.

Here, problems in a case of integrally molding a laminate 400 including a conventional thermoplastic resin expanded beads molded article 410 (hereinafter, also referred to as the expanded beads molded article 410) and polyurethane foam 420 laminated thereon will be described with reference to FIGS. 4A to 4C.

The conventional expanded beads molded article 410 shown in FIG. 4A is prepared, used as a core member 410C as shown in FIG. 4B, and placed in a cavity of a molding mold to be omitted shown. Then, the polyurethane foam raw material is fed in the remaining part of the cavity and expanded to laminate the polyurethane foam 420 on the core member 410C. At this time, the expanded beads molded article 410 placed in the cavity is compressed by blowing pressure of urethane, and becomes smaller than an original size S1 (see FIG. 4B), and a space ratio occupied by the polyurethane foam 420 increases accordingly. Next, after the urethane foaming is completed, the laminate 400 is ejected from the molding mold. Since size restriction by the molding mold is eliminated, as shown in FIG. 4C, the expanded beads molded article 410 compressed in the molding mold to have a size S2 smaller than the original size returns to the original size or a size close to the original size, and in conjunction with this, the polyurethane foam 420 laminated also expands outward. As a result, external dimensions of the laminate 400 becomes larger than a designed size S3 (a size indicated by an outer peripheral surface of the cavity of the molding mold), and the laminate is considered to lack the dimensional stability.

It is considered that such dimensional stability is alleviated by using the core member 100C that is molded using the expanded beads 20 having the through holes 22 as the expanded beads constituting the expanded beads molded article 100 and in which the average porosity of the expanded beads molded article 100 is 10% or more and 25% or less. As described above, since the expanded beads molded article 100 has the gaps derived from the through holes 22 inside, it is considered that the blowing pressure during forming the polyurethane foam can be released through the gaps, and as a result, it is considered that this can prevent compression such as that of the foamed bead molding 410 shown in FIG. 4(*b*).

When the average porosity is less than 10%, the blowing pressure for urethane foaming cannot be sufficiently released during preparing the laminate, shrinkage of the expanded beads molded article 100 used as the core member 100C increases, and the dimensional stability of the resulting laminate may not be sufficient. On the other hand, when the average porosity exceeds 25%, although the blowing pressure for urethane foaming can be sufficiently released, the adhesion properties between the expanded beads molded article 100 and the urethane foam become remarkably strong, and there is a possibility that the laminate lacks recyclability. Note that, in the present description, the blowing pressure for urethane foaming means a pressure generated when the space inside the molding mold is narrowed by urethane foaming inside the molding mold and air inside the molding mold is compressed. Note that, the voids measured by the average porosity include, in the expanded beads molded article, voids formed between the expanded beads and voids formed by the through holes of the expanded beads.

In the present invention, the average porosity of the expanded beads molded article 100 refers to a porosity of the entire expanded beads molded article 100 having a predetermined shape. The average porosity of the expanded beads molded article is a value calculated using the following formula (1).

[Mathematical formula 1]

$$\text{Porosity (\% by volume)}=[(X-Y)/X]\times 100 \quad (1)$$

Here, X is an apparent volume ($cm^3$) of the expanded beads molded article, and Y is a true volume ($cm^3$) of the expanded beads molded article. The apparent volume X is a volume calculated from external dimensions of the expanded molded article. The true volume Y is a substantial volume excluding the void portions of the expanded molded article, and can be determined by measuring the volume of increased liquid when the expanded molded article is submerged in a liquid (for example, alcohol).

Note that, the average porosity can be obtained by measuring 10 or more samples of 20 mm×20 mm×100 mm (excluding a surface skin portion of the expanded beads molded article) randomly selected and cut out from the core member (the expanded beads molded article), and averaging the measured values.

From a viewpoint of adhesion properties with polyurethane foam, the lower limit of the porosity of a surface layer portion of the expanded beads molded article 100 is preferably 10% or more, more preferably 12% or more, and still more preferably 13% or more, and the upper limit of the porosity is preferably 20% or less, more preferably 19% or less, and still more preferably 18% or less. From the same viewpoint, the porosity is preferably 10% or more and 20% or less, more preferably 12% or more and 19% or less, and still more preferably 13% or more and 18% or less.

From a viewpoint of sufficiently releasing the blowing pressure during urethane foaming to realize a good dimensional stability and facilitating peeling between the core member and the polyurethane foam during recycling, the expanded beads molded article 100 preferably has a porosity in the surface layer portion in the range described above, and a ratio (P/Q) of a porosity P of the surface layer portion to an average porosity Q in the range described above is preferably 1.0 or more and 1.2 or less.

In the present invention, the porosity of the surface layer portion is obtained by cutting out a portion from a portion of 5 mm in a depth direction from the surface to a portion further up to 25 mm in the depth direction as a sample (20 mm×20 mm×100 mm) for a surface side portion of the expanded beads molded article 100, and measuring the porosity of the portion in a manner similar to the method for calculating the average porosity described above.

(Ratio of Total Opening Area of Through Hole Portions to Surface Area of Expanded Beads Molded Article)

The lower limit of the ratio of the total opening area of the through hole portions 14 to the surface area of the expanded beads molded article 100 is 2% or more, and the upper limit of the ratio of the total opening area is 5% or less. Since the through hole portions 14 are formed by the through holes 22 penetrating the inside of the expanded beads 20, a depth of the through hole portions 14 is close to a size of the expanded beads 20 (lengths of the through holes 22 in the opening direction d). Therefore, it is considered that the polyurethane foam enters into deep positions of the through hole portions 14 from the void portions 12, and grip force of the urethane foam to the expanded beads molded article 100 is improved. When the ratio of the total opening area of the through hole portions 14 is within the range described above, adhesion between the expanded beads molded article 100 and the urethane foam can withstand practical use, and the adhesion properties can be made recyclable. From the above viewpoint, the lower limit of the numerical range described above is preferably 2.1% or more and more preferably 2.2% or more, and the upper limit of the numerical range described above is preferably 4% or less and more preferably 3.5% or less. From the same viewpoint, the ratio is preferably 2.1% or more and 4% or less, and more preferably 2.2% or more and 3.5% or less.

Further, in order to solve the desired problem, the present invention is configured such that in an observation region 200, the lower limit of the average opening area of the through hole portions 14 of the expanded beads 20 is set to 5 $mm^2$ or more, the upper limit of the average opening area is specified to 20 $mm^2$ or less, and a ratio [(r3/R1)×100] of a total number r3 of the through hole portions 14 having an opening area of 2 $mm^2$ or more to a total number R1 of the through hole portions 14 of the expanded beads 20 is 60% or less.

With such a configuration, the core member 100C having a small number of the through hole portions 14 having a significantly large opening area is provided, so that it is possible to prevent the adhesion properties to the polyurethane foam from becoming too strong when it is laminated. Further, from the above viewpoint, the upper limit of the ratio of the total number r3 of the through hole portions 14 having an opening area of 2 $mm^2$ or more to the total number R1 of the through hole portions 14 is preferably 55% or less, more preferably 50% or less, and still more preferably 48% or less, and the lower limit of the ratio of the total number r3 is preferably 20% or more.

Here, the average opening area of the through hole portions 14 is determined by measuring the areas of all the through hole portions 14 observed in one observation region 200 one by one and dividing the sum of the measured values by the number of the observed through hole portions 14.

Further, the ratio of the total number r3 of the through hole portions 14 having an opening area of 2 $mm^2$ or more to the total number R1 of the through hole portions 14 of the expanded beads 20 is determined by counting the number of all the through hole portions 14 and the number of the through hole portions 14 having an opening area of 2 $mm^2$ or more in the observation region 200 and calculating the ratio. Note that, the upper limit of the opening area of the through hole portions 14 is approximately 30 $mm^2$.

Further, a ratio of the total number r1 of the through hole portions 14 having an opening area of more than 0 $mm^2$ and less than 1 $mm^2$ to the total number R1 of the through hole portions 14 of the expanded beads 20 calculated in the same manner is preferably 50% or less. Within the above range, the adhesive strength between the expanded beads molded article 100 and the urethane foam can be set to a practical and recyclable range. From the above viewpoint, the lower limit of the ratio of the total number r1 of the through hole portions 14 having an opening area of more than 0 $mm^2$ and less than 1 $mm^2$ described above is preferably 10% or more and more preferably 15% or more, and the upper limit of the ratio of the total number r1 is more preferably 40% or less and still more preferably 35% or less. From the same viewpoint, the ratio is preferably 10% or more and 40% or less, and more preferably 15% or more and 35% or less.

Furthermore, from the above viewpoint, the lower limit of the average opening area of the through hole portions 14 is preferably 8 $mm^2$ or more, and more preferably 10 $mm^2$ or more, and the upper limit of the average opening area is preferably 18 $mm^2$ or less, and more preferably 16 $mm^2$ or less. From the same viewpoint, the area is preferably 8 $mm^2$ or more and 18 $mm^2$ or less, and more preferably 10 $mm^2$ or more and 16 $mm^2$ or less.

(Concave Portions on Surface of Expanded Beads Molded Article)

As shown in FIGS. 1 and 2, it is preferable that a plurality of concave portions 10 including the through hole portions 14 of the expanded beads 20 and the void portions 12 formed between adjacent expanded beads 20 are formed on the surface of the expanded beads molded article 100. FIGS. 1 and 2 show the concave portions 10 in the observation region 200 determined in the expanded beads molded article 100, and for ease of understanding, a part of the void portions 12 in the concave portions 10 are painted black in FIG. 1, and the through hole portions 14 in the concave portions 10 are painted black in FIG. 2.

Since these concave portions 10 formed by the through hole portions 14 and the void portions 12 exist on the surface of the expanded beads molded article 100 at a ratio in a specific range, the polyurethane foam enters into different concave portions 10 during urethane foaming, and the polyurethane foam and the expanded beads molded article 100 are favorably bonded. In an example of the present invention shown in FIGS. 1 and 2, since the concave portions 10 are formed including the through hole portions 14 and the void portions 12 having different shapes, a degree of such adhesion can be set to a range that can sufficiently withstand practical use, and can be prevented from becoming too strong to an extent that the polyurethane foam and the expanded beads molded article 100 can be easily peeled off from each other during recycling. Such adjustment can be specifically performed as follows.

(Ratio of Total Opening Area of Concave Portions to Surface Area of Expanded Beads Molded Article)

In the present invention, in the observation region 200, the lower limit of the ratio of a total opening area T of the concave portions 10 to the surface area of the expanded beads molded article 100 is preferably 10% or more, and the upper limit of the ratio of the total opening area T is preferably 35% or less. By adjusting to such a range, when the expanded beads molded article 100 is used as the core member 100C of the laminate, it is easy to provide a laminate that is excellent in dimensional stability during production and in which the expanded beads molded article 100 and the urethane foam are easily peeled off from each other during recycling.

From such viewpoint, the ratio of the total opening area T of the concave portions 10 described above is more preferably 15% or more, still more preferably 20% or more.

On the other hand, when the ratio of the total opening area T of the concave portions 10 exceeds 35%, the adhesion between the expanded beads molded article 100 and the urethane foam becomes too strong in the laminate, and peel properties may be degraded during recycling. From such viewpoint, the ratio of the total opening area T of the concave portions 10 described above is more preferably 30% or less.

Here, the surface area of the expanded beads molded article 100 observed in the observation region 200 is an area of a plane of the observation region 200 in a top view. In other words, the surface area is not an area along surface asperities in the observation region 200. From the same viewpoint, the ratio is preferably 10% or more and 35% or less, more preferably 15% or more and 30% or less, and still more preferably 20% or more and 30% or less.

(Average Opening Area of Concave Portions)

In the observation region 200, the lower limit of the average opening area of the concave portions 10 is preferably 1 $mm^2$ or more, more preferably 1.2 $mm^2$ or more, further preferably 1.5 $mm^2$ or more, and particularly preferably 1.6 $mm^2$ or more, and the upper limit of the average opening area is preferably 5 $mm^2$ or less, more preferably 3 $mm^2$ or less, further preferably 2 $mm^2$ or less, and particularly preferably 1.9 $mm^2$ or less. Within the above range, the adhesion properties between the expanded beads molded article and the urethane foam is excellent in a balance between practicality and recyclability. From the same viewpoint, the area is preferably 1 $mm^2$ or more and 5 $mm^2$ or less, more preferably 1.2 $m^2$ or more and 3 $mm^2$ or less, and still more preferably 1.5 $mm^2$ or more and 2 $mm^2$ or less.

The average opening area of the concave portions 10 is obtained by measuring the areas of all the through hole portions 14 and the opening areas of all the void portions 12 in the observation region 200, obtaining the sum thereof, and dividing the sum by the number of all the through hole portions 14 and all the void portions 12 measured to obtain the average opening area of individual concave portion 10.

(Ratio of Total Opening Area of Through Hole Portions of Expanded Beads to Total Opening Area of Concave Portions)

Further, in the present invention, in the observation region 200, the lower limit of a ratio (t1/T) of a total opening area t1 of the through hole portions 14 of the expanded beads 20 to the total opening area T of the concave portions 10 is preferably 0.05 or more, and the upper limit of the ratio (t1/T) is preferably 0.3 or less. In this manner, the total opening area t1 of the through hole portions 14 is adjusted to be smaller than the total opening area of the void portions 12 within a predetermined range, whereby in the laminate, the core member 100C and the urethane foam can be bonded to each other to an extent that they can withstand practical use, and can be easily peeled off from each other during recycling. From such viewpoint, the lower limit of the ratio (t1/T) of the total opening area described above is more preferably 0.08 or more, still more preferably 0.1 or more, and the upper limit of the ratio (t1/T) is more preferably 0.25 or less, still more preferably 0.2 or less. From the same viewpoint, the ratio is preferably 0.05 or more and 0.3 or less, more preferably 0.08 or more and 0.25 or less, and still more preferably 0.1 or more and 0.2 or less.

Further, it is particularly preferable that the lower limit of the ratio (t1/T) of the total opening area t1 of the through hole portions 14 of the expanded beads 20 to the total opening area T of the concave portions is 0.05 or more, the upper limit of the ratio (t1/T) is 0.3 or less, the lower limit of the ratio of the total opening area T of the concave portions 10 to the surface area of the expanded beads molded article 100 is 10% or more, and the upper limit of the ratio of the total opening area T is 35% or less.

(Ratio of Total Opening Area of Void Portions to Surface Area of Expanded Beads Molded Article)

The lower limit of the ratio of the total opening area of the void portions 12 to the surface area of the expanded beads molded article 100 is preferably 15% or more, more preferably 18% or more, and the upper limit of the ratio of the total opening area is preferably 30% or less, more preferably 28% or less. From the same viewpoint, the ratio is preferably 15% or more and 30% or less, and more preferably 18% or more and 28% or less.

Further, in the observation region 200, the lower limit of the ratio of a total number r6 of the void portions 12 having an opening area of 2 $mm^2$ or more to a total number R2 of the void portions 12 between the expanded beads 20 is preferably 20% or more, and more preferably 25% or more, and the upper limit of the ratio of the total number r6 is preferably 40% or less, and more preferably 35% or less. From the same viewpoint, the ratio is preferably 20% or more and 40% or less, and more preferably 25% or more and 35% or less.

Furthermore, the lower limit of the ratio of a total number r4 of the void portions 12 having an opening area of more than 0 $mm^2$ and less than 1 $mm^2$ to the total number R2 of the void portions 12 between the expanded beads 20 calculated in the same manner is preferably 60% or more and more preferably 62% or more, and the upper limit of the ratio of the total number r4 is preferably 80% or less and more preferably 70% or less. Within the above range, the adhesive strength between the expanded beads molded article 100 and the urethane foam can be set to a practical and sufficiently recyclable range. From the same viewpoint, the ratio is preferably 60% or more and 80% or less, and more preferably 62% or more and 70% or less.

(Method for Measuring Area of Through Hole Portion, Void Portion, or Concave Portion)

On the surface of the expanded beads molded article 100, depth distribution of the concave portions 10 is measured in the observation region 200 (for example, a rectangular region of 25 mm×25 mm) randomly determined from a flat portion of the molded article by an optical non-contact measuring machine (VR3200, manufactured by Keyence Corporation), and an enlarged photograph of a cross-sectional area of a portion of 0.5 mm deeper from a reference line in the depth direction is taken. The enlarged photograph is converted into image data by a commercially available scanner device. Next, an image of the enlarged photograph converted into the image data is subjected to monotone processing to adjust a monotone image, and the void portions 12 are displayed in color (for example, black). Note that, the monotone processing can be performed, for example, by using image analysis software (NS2K-Pro, manufactured by Nanosystem Corporation) for the enlarged photograph converted into image data. The area of the void portions 12 is measured by calculating the area of a portion that is subjected to the monotone processing and expressed in color such as black based on the image data. Further, the area of the through hole portions 14 is measured by the same operation as described above except that the image of the enlarged photograph converted into the image data is subjected to the monotone processing to adjust the monotone image, and the through hole portions 14 are displayed in color. The measured value regarding the concave portions 10 can be calculated by appropriately using the measured value regarding the void portions 12 and the measured value regarding the through hole portions 14.

Note that, the area of the concave portions 10 can be measured by performing the above measurements on 10 observation regions determined in the same manner and obtaining an arithmetic mean of the values obtained in each observation region.

(Molded Article Density of Expanded Beads Molded Article)

A molded article density of the expanded beads molded article 100 described above is not particularly limited, but from the viewpoint of excellent balance between lightweight properties and mechanical physical properties such as rigidity, the lower limit of the molded article density is preferably 15 $kg/m^3$ or more, more preferably 20 $kg/m^3$ or more, and the upper limit of the molded article density is preferably 50 $kg/m^3$ or less, more preferably 40 $kg/m^3$ or less. From the same viewpoint, the density is preferably 15 kg/m$^3$ or more and 50 kg/m$^3$ or less, and more preferably 20 kg/m$^3$ or more and 40 kg/m$^3$ or less.

Note that, the molded article density of the expanded beads molded article 100 is a value determined by dividing a weight of the expanded beads molded article 100 by an apparent volume calculated from the external dimensions of the expanded beads molded article 100.

(Airflow Volume of Expanded Beads Molded Article)

In the present invention, an airflow volume of the expanded beads molded article 100 is not particularly limited, but from the viewpoint of a laminate exhibiting better dimensional stability can be provided, the lower limit of the airflow volume of the expanded beads molded article 100 is preferably 270 L/min or more, more preferably 280 L/min or more, and the upper limit of the airflow volume is preferably 330 L/min or less, more preferably 310 L/min or less. From the same viewpoint, the airflow volume is preferably 270 L/min or more and 330 L/min or less, and more preferably 280 L/min or more and 310 L/min or less.

The airflow volume is measured as follows. To start with, a surface portion (excluding a skin layer) is cut from the obtained expanded beads molded article into dimensions of a diameter of 100 mm×a thickness of 20 mm, and this is used as a sample. In accordance with JIS K6400-7A method (a positive pressure system): 2012, this sample is set in a device for measuring the airflow volume assembled in an order of a regulator, a flow meter (on an inlet side), a pressure gauge (on the inlet side), a sample fixture, a pressure gauge (on an outlet side), and a flow meter (on the outlet side). Air of 0.6 MPa is blown from the inlet side to the sample set in the device, and the airflow volume is measured from the flow meter on the inlet side based on JIS K6400-7A method: 2012. Note that, the sample is measured as an open system.

(Method for Adjusting Configuration of the Present Invention)

The areas of the through hole portions 14 and the porosity of the expanded beads molded article 100 specified in the present invention can be adjusted, for example, by adjusting the opening area of the through hole portions 14 of the expanded beads 20 by adjusting the size of an inner diameter of a die in preparation of resin particles used for the preparation of the expanded beads 20 having the through holes 22, or by adjusting secondary expansion characteristics during molding the expanded beads 20 by appropriately adjusting a flexural modulus of the thermoplastic resin constituting the resin particles. Further, the area of the through hole portions 14 and the porosity of the expanded beads molded article 100 can be set within the ranges specified in the present invention by performing cracking molding as follows.

Note that, in the present invention, it has been found that the through holes 22 of the expanded beads 20 constituting the expanded beads molded article 100 can have a specific shape suitable for laminating the urethane foam by adjusting hole diameters of the through holes 22 of the expanded beads 20 constituting the core member 100C, changing conditions for cracking molding of the expanded beads molded article 100, or changing a resin constituting the expanded beads 20 constituting the core member 100C. However, the method for forming (adjusting) the through holes 22 is not limited thereto. In order to obtain the expanded beads molded article 100 having a specified desired configuration of the present invention, appropriate molding conditions can be determined in advance in a preliminary experiment with reference to the following control method. Further, not only the through holes 22 but also the void portions 12 and the concave portions 10 can similarly have specific shapes by changing the conditions of cracking molding during the in-mold molding using the expanded beads 20 constituting the core member 100C, changing the resin constituting the expanded beads 20 constituting the core member 100C, or the like.

An outline of cracking molding will be described. When the expanded beads molded article 100 is prepared, generally, as shown in FIG. 3, the in-mold molding is performed using a pair of molding molds 300 including a male mold 320 and a female mold 330. During the in-mold molding, when a cavity 310 is fed with the expanded beads 20 from a feeding port 340, opposing surfaces of the male mold 320 and the female mold 330 are opened by a predetermined interval (a cracking 350). For example, in a case where the expanded beads molded article 100 having a plate shape is prepared, a gap of the cracking 350 is secured in a thickness direction of the expanded beads molded article 100. Then, after feeding of the expanded beads 20 is completed, the opposing surfaces of the male mold 320 and the female mold 330 are brought into contact with each other to perform mold clamping (that is, the cracking 350 is set to 0), and the in-mold molding may be performed. Since the expanded beads 20 are crushed by mold clamping as amount of the cracking 350 increases, the through holes 22 also tend to be smaller, and the gaps (the voids) between the expanded beads 20 also tend to be smaller. In this way, the average porosity of the obtained expanded beads molded article 100 and the opening area of the concave portions 10 can be adjusted to be smaller.

Further, as another means, steam pressure during the in-mold molding of the expanded beads molded article 100 may be adjusted. For example, by increasing the steam pressure, the expanded beads 20 are sufficiently secondarily expanded in the molding mold, and as a result, it is possible to perform adjustment so that the through holes 22 become smaller and the gaps (the voids) between the expanded beads 20 become smaller. In this way, the shape and area of the through hole portions 14 and the opening area of the concave portions 10 can be adjusted.

Further, as another means, an operation of increasing internal pressure of cells of the expanded beads 20 is performed by storing the expanded beads 20 in a sealed vessel that can be pressurized and injecting a gas such as air into the sealed vessel to perform a pressurization treatment. Thus, by causing the expanded beads 20 to sufficiently secondarily expand in the molding mold by using the expanded beads 20 having an increased internal pressure for the in-mold molding, it is possible to adjust the opening area of the concave portions 10 in the same manner as described above.

(Expanded Beads)

Next, the expanded beads 20 having the through holes 22 used for forming the expanded beads molded article 100 described above will be described.

As a base material resin constituting the expanded beads 20, any thermoplastic resin can be used. For example, one or two or more of polyethylene-based resins such as ethylene-propylene copolymers, propylene-butene copolymers, ethylene-propylene-butene terpolymers, and homopolypropylene, polyethylene-based resins such as low-density polyethylene, medium-density polyethylene, high-density polyethylene, linear low-density polyethylene, ultra-low-density polyethylene, ethylene-vinyl acetate copolymers, ethylene-methyl methacrylate copolymers, and ionomer-based resins obtained by crosslinking molecules of ethylenemethacrylic acid copolymers with metal ions, polybutene, polypentene, and the like can be exemplified. Among them, low-density polyethylene, medium-density polyethylene, high-density polyethylene, linear low-density polyethylene, very-low-density polyethylene, polypropylene, polybutene, ethylene-propylene copolymer, propylene-butene copolymer, ethylene-propylene-butene terpolymer, and the like are preferable in view of good recovery after compression of expanded molded article. Note that, the copolymer and the terpolymer may be a random copolymer or a block copolymer, but a random copolymer is more preferable.

The thermoplastic resin described above may be in a non-crosslinked state, but may be crosslinked by peroxide, radiation, or the like. However, in terms of the number of production processes and recyclability, a non-crosslinked product is preferable.

Note that, in a case where the expanded beads are multilayer expanded beads to be described later, the base material resin constituting an expanded core layer is preferably the resin described above.

In the base material resin constituting the expanded beads 20, a blending ratio of the thermoplastic resin is preferably more than 50 wt %, more preferably 70 wt % or more, still more preferably 90 wt % or more, and particularly preferably 100 wt %. The base material resin may contain a resin other than the thermoplastic resin or another material such as an elastomer together with the thermoplastic resin, as long as it does not deviate from the scope of the invention.

In a case where the expanded beads 20 are polypropylene-based resin expanded beads, the flexural modulus of the polypropylene-based resin constituting the polypropylene-based resin expanded beads is preferably 1200 MPa or less, more preferably 1100 MPa or less, and still more preferably 1000 MPa or less. Further, the lower limit thereof is preferably 700 MPa or more, and more preferably 800 MPa or more. From the same viewpoint, the modulus is preferably 700 MPa or more and 1200 MPa or less, more preferably 800 MPa or more and 1100 MPa or less, and still more preferably 800 MPa or more and 1000 MPa or less.

Within the above range, the hole diameters of the through holes 22 of the expanded beads 20 by secondary expansion and the shapes and areas of the through hole portions exposed to the surface can be favorably controlled by adjusting the steam pressure and the amount of the cracking 350 during the in-mold molding using these resins, so that each configuration of the present invention can be easily adjusted to a desired range. In other words, a polypropylene-based resin having a flexural modulus in the above range has a suitable influence on the secondary expansion characteristics of the expanded beads when steam is added into the mold during the in-mold molding, and can appropriately crush the through holes of the expanded beads during cracking. Accordingly, the hole diameters of the through holes 22 of the expanded beads 20 and the shapes and areas of the through hole portions exposed to the surface of the molded article can be controlled, and as a result, the ratio of the total opening area of the through hole portions specified in the present invention, the average opening area of the through hole portion, and the like can be easily adjusted to a predetermined range.

Note that, the fact that the expanded beads 20 are polypropylene-based resin expanded beads means that more than 50 wt % of the polypropylene-based resin is contained in 100 wt % of the thermoplastic resin constituting the expanded beads 20. As the polypropylene-based resin expanded beads, the polypropylene-based resin is contained in an amount of preferably 70 wt % or more, more preferably 90 wt % or more, and still more preferably 100 wt % based on 100 wt % of the thermoplastic resin.

The flexural modulus of the resin can be determined by preparing a test piece (test piece size; length of 80 mm, width of 10 mm and thickness of 4 mm) by injection molding based on JIS K7171: 2008. Note that, in a case where the expanded beads 20 have a multilayer structure including a core layer and a covering layer to be described later, the flexural modulus of the resin constituting the core layer may satisfy the above range.

Note that, the flexural modulus of the resin constituting the core layer can be measured by the same method after performing a pretreatment by a method of melting and defoaming the obtained expanded beads, in addition to measuring the flexural modulus of a resin raw material to be used by the above method.

Further, in the expanded beads 20, other additives may be added to the base material resin as long as it does not deviate from the scope of the invention. Examples of other additives include coloring pigment or dye such as black, gray, and brown, flame retardant, flame retardant auxiliary, cell controlling agent, catalyst neutralizing agent, lubricant, crystal nucleating agent, and antistatic agent.

Examples of the expanded beads 20 having the through holes 22 include those having a tubular shape in which (a) an outer peripheral shape and the shape of a hollow portion are both circular, (b) the outer peripheral shape and the shape of the hollow portion are both polygonal, (c) the outer peripheral shape is circular and the shape of the hollow portion is polygonal, (d) the outer peripheral shape is polygonal and the shape of the hollow portion is circular, and (e) the shapes obtained by joining the above (a) to (d) to each other at the outer periphery.

Since such expanded beads having a tubular shape have orientation, whether the through hole portions exist on the surface of the molded article or peripheral wall portions of the tubes exist on the surface of the molded article is statistically converged during the in-mold molding, and a molded article having the specific concave portions 10 on the surface of the molded article can be prepared.

An outer shape of the expanded beads 20 having a tubular shape, the dimension of the hollow portion constituting the through holes 22, and the like can be appropriately designed. For example, taking as an example a case where both the outer peripheral shape and the shape of the hollow portion are circular as in the expanded beads 20 in a tubular shape having the through holes 22 enlarged in FIG. 3, it is preferable that the lower limit of the outer diameter of the expanded beads 20 having a tubular shape is 2 mm or more, the upper limit of the outer diameter is 6 mm or less, the lower limit of the inner diameter is 1 mm or more, the upper limit of the inner diameter is 3 mm or less, the lower limit of the length is 2 mm or more, the upper limit of the length is 6 mm or less, the lower limit of the length of the through holes 22 is 2 mm or more, and the upper limit of the length is 6 mm or less from the viewpoint of impregnating ability of the urethane foam constituting the laminate. From the same viewpoint, the length of the expanded beads 20 and the length of the through holes 22 are more preferably 2 mm or more and 6 mm or less.

Note that, in a single expanded bead before constituting the expanded beads molded article 100, a hole shape in the cross section perpendicular to an axis of the through hole of the expanded beads is substantially circular. On the other hand, the expanded beads 20 constituting the expanded beads molded article 100 may have a shape different from a circular shape due to deformation or crushing of the through holes 22.

The expanded beads 20 constituting the expanded beads molded article 100 and having the through holes 22 may have a single-layer structure composed of one layer from an outer surface to an inner surface, or may be expanded beads having a multilayer structure (multilayer expanded beads) configured to have an expanded core layer 24 and a covering layer 26 covering the expanded core layer 24 as in the expanded beads 20 having a tubular shape enlarged in FIG. 3. Any different layer may be disposed between the expanded core layer 24 and the covering layer 26. Further, while the expanded core layer 24 is a layer made of a foam resin, the covering layer 26 may be a layer made of a non-foam resin or a layer made of a foamed resin. The resin constituting each layer constituting the expanded beads 20 having the multilayer structure may be the same kind of resin or different resins, and the same resin as the thermoplastic resin described above as the base material resin constituting the expanded beads 20 can be used.

The base material resin of the expanded core layer 24 is preferably a polypropylene-based resin, and the flexural modulus thereof is preferably 1200 MPa or less, more preferably 1100 MPa or less, and still more preferably 1000 MPa or less. Further, the lower limit of the flexural modulus is preferably 700 MPa or more, and more preferably 800 MPa or more. From the same viewpoint, the modulus is preferably 700 MPa or more and 1200 MPa or less, more preferably 800 MPa or more and 1100 MPa or less, and still more preferably 800 MPa or more and 1000 MPa or less.

When the base material resin of the expanded core layer 24 is within the range of the flexural modulus, the hole diameters of the through holes 22 of the expanded beads 20 (multilayer expanded beads) can be favorably controlled by adjusting the steam pressure and the amount of the cracking 350 during the in-mold molding, so that each configuration of the present invention can be more easily adjusted to a desired range. Note that, the flexural modulus of the resin of the expanded core layer can be measured in the same manner as described above based on JIS K7171: 2008. The flexural modulus of the resin constituting the expanded core layer 24 can be measured by the same method after performing a pretreatment by a method of melting and defoaming an expanded core layer portion from which a covering layer portion of the expanded beads has been removed, in addition to measuring the flexural modulus of the resin raw material to be used by the above method.

For example, in the expanded beads 20 having a multilayer structure including the expanded core layer 24 and the covering layer 26 that covers the expanded core layer 24, it may be that the expanded core layer 24 is made of a polypropylene-based resin and the covering layer 26 is made of any thermoplastic resin, and it is preferable that the expanded beads can be produced by the in-mold molding at a molding temperature lower than the molding temperature of single-layer expanded beads made of a resin constituting the expanded core layer 24. The resin constituting the expanded core layer 24 and the resin constituting the covering layer 26 may be, for example, resins having the same physical properties, but are preferably resins having different melting points or softening points. In particular, the resin constituting the covering layer 26 is preferably a resin having a melting point or softening point lower than the melting point of the resin constituting the expanded core layer 24. Accordingly, the covering layer 26 can function as a fuse-bond layer. In other words, in a case where the in-mold molding is performed using the expanded beads 20, the covering layer 26 can be melted or softened at a steam pressure lower than the melting point of the expanded core layer 24, and the expanded beads 20 can be favorably fused to each other.

In particular, in the present invention, shapes of the through hole portions 14 and shapes of the concave portions 10 on the surface of the expanded beads molded article 100 can be set to a specific range by reducing a die hole diameter during producing the resin particles, making the inner diameters of the through holes 22 of the expanded beads 20 relatively small by using a resin having the lower limit of the flexural modulus of 700 MPa or more and the upper limit of the flexural modulus of 1200 MPa or less as the polypropylene-based resin constituting the resin particles and the expanded beads, and, making the lower limit of the cracking rate during cracking molding 20% or more, and adjusting the upper limit of the cracking rate to 30% or less.

[Method for Producing Laminate]

Hereinafter, examples of methods for producing expanded beads having through holes, an expanded beads molded article, and a laminate will be described. An expanded beads molded article using expanded beads having through holes can be produced by a conventionally known method such as, for example, JP H08-108441 A, JP H07-137063 A, and JP 2012-126816 A.

Specifically, first, a thermoplastic resin that serves as the base material resin constituting the expanded beads is melted and kneaded with an extruder. Thereafter, the thermoplastic resin particles (hereinafter, also referred to as the resin particles) are produced by a method in which the thermoplastic resin is extruded in a strand shape from an extruder die provided in the extruder, cooled and then cut to an appropriate length, or cooled after being cut to an appropriate length.

At this time, the resin particles having through holes can be prepared by selecting one having a slit similar to the cross-sectional shape of a desired tubular thermoplastic resin particle at a molten resin outlet of the extruder die, or by using one provided with a pressure adjusting hole for maintaining the pressure of a tubular strand hole portion at normal pressure or higher inside the slit in order to maintain the tubular shape.

Next, the resin particles are fed in a sealed vessel containing a dispersion medium, dispersed in the dispersion medium, and heated to a temperature higher than or equal to a softening temperature of the resin particles to impregnate the resin particles with a blowing agent. Thereafter, the sealed vessel is temporarily opened, and while the pressure in the sealed vessel is maintained at a pressure higher than or equal to a vapor pressure of the blowing agent, the resin particles and the dispersion medium are simultaneously released under an atmosphere lower in pressure than the inside of the vessel (usually under atmospheric pressure) to expand the resin particles. As a result, thermoplastic resin expanded beads having through holes can be obtained.

Examples of the blowing agent usually include volatile organic blowing agents such as propane, isobutane, butane, isopentane, pentane, cyclopentane, hexane, cyclobutane, cyclohexane, chlorofluoromethane, trifluoromethane, 1,2,2,2-tetrafluoroethane, 1-chloro-1,1-difluoroethane, 1,1-difluoroethane, and 1-chloro-1,2,2,2-tetrafluoroethane, and inorganic gas blowing agents such as nitrogen, carbon dioxide, argon, and air. Among them, as the blowing agent, an inorganic gas blowing agent that does not destroy the ozone layer and is inexpensive is preferable, and particularly, nitrogen, air, and carbon dioxide are preferable. Further, the blowing agent may be used in one kind or in a mixed system of two or more kinds thereof.

The dispersion medium to be used for obtaining the thermoplastic resin expanded beads may be any dispersion medium that does not dissolve the resin particles, and examples of such a dispersion medium include one kind or a combination of two or more kinds of water, ethylene glycol, glycerin, methanol, ethanol, and the like, but water is usually used.

Further, when the resin particles are dispersed in the dispersion medium and heated to an expanding temperature, a dispersant can also be used to prevent fusion between the resin particles.

By feeding the thermoplastic resin expanded beads prepared by the method as described above in the molding mold and heating to a predetermined temperature to perform in-mold molding, an expanded beads molded article is obtained in which the thermoplastic resin expanded beads having through holes are mutually fused.

Note that, in appropriate steps of preparing the resin particles having through holes, preparing expanded beads, and preparing the expanded beads molded article described above, it is preferable to adjust production conditions to adjust the opening area of the concave portions on the surface of the expanded beads molded article to be obtained, the average porosity of the expanded beads molded article, the porosity of the surface layer portion, and the like.

A laminate is produced using the expanded beads molded article prepared as described above as a core member.

Specifically, the expanded beads molded article is placed in the cavity of the molding mold for molding polyurethane foam, and a liquid polyurethane foam raw material is supplied to the remaining space of the cavity.

As the liquid polyurethane foam raw material, a known material can be appropriately used, and polyurethane and various blowing agents can be contained. Further, the amount of the liquid polyurethane foam raw material and the like can also be appropriately set according to the desired density of the polyurethane foam.

By subjecting the liquid polyurethane foam raw material supplied to the cavity to urethane foaming by heating or the like, a laminate obtained by laminating and integrating the expanded beads molded article and the polyurethane foam is produced.

At this time, when the raw material for polyurethane foam is foamed, the space in the mold decreases and the pressure in the mold increases, but the pressure escapes to the outside through voids formed in the expanded beads molded article, so that the expanded beads molded article does not significantly shrink. The voids are mainly caused by through holes provided in the expanded beads constituting the expanded beads molded article. On the other hand, when the raw material for polyurethane foam is supplied onto the expanded beads molded article, the polyurethane foam moderately enters the concave portions on the surface of the expanded beads molded article, particularly the through hole portions, so that the expanded beads molded article and the polyurethane foam are bonded to each other to an extent that the expanded beads molded article can withstand practical use. However, in the expanded beads molded article that is the core member of the present invention, the opening area of the through hole portions of the surface is adjusted to a satisfactory range, and the polyurethane foam is prevented from excessively entering the expanded beads molded article. Therefore, the expanded beads molded article and the polyurethane foam can be easily separated when the laminate is recycled.

Note that, in the laminate produced as described above, the core member is not significantly compressed by a molding pressure of the urethane in the molding mold. Therefore, the laminate including the core member of the present invention is suppressed from increasing in dimension of the polyurethane foam due to restoration of the dimension of the core member as in the conventional laminate after being ejected from the molding mold, and is excellent in dimensional stability.

Further, the laminate is formed by laminating polyurethane foam on the core member of the present invention made of an expanded beads molded article. The expanded beads molded article used as the core member of the laminate consists of a fused body of thermoplastic resin expanded beads having through holes, the expanded beads molded article has voids communicating with the outside, the expanded beads molded article has a porosity of 10% or more and 25% or less, and a part of the polyurethane foam is impregnated into the voids or the through hole portions of the expanded beads molded article and cured.

Note that, from the laminate, it is also possible to measure characteristics such as the opening areas of the through hole portions of the expanded beads to the surface area of the thermoplastic resin expanded beads molded article specified, from the core member of the present invention as well. Specifically, the polyurethane foam provided in the laminate is cut off at the surface of the core member, and the surface of the exposed core member (hereinafter, referred to as the exposed surface) is observed. The polyurethane foam observed on a part of the exposed surface is generally polyurethane foam that is fed and cured in concave portions including through hole portions of expanded beads constituting the core member and void portions formed between adjacent expanded beads. Therefore, various measurements can be performed by recognizing a region where the polyurethane foam exists on the exposed surface as a concave portion. Further, since it is possible to determine whether the concave portion recognized on the exposed surface is a through hole portion or a void portion from its shape or the like, it is also possible to individually measure the areas or the like of the through hole portions and the void portions on the exposed surface.

EXAMPLES

Hereinafter, the present invention will be described in detail with reference to examples, but the present invention is not limited thereto. Note that, various measurements and evaluations were performed on each example and each comparative example obtained as follows. The results are shown in a table. Further, these measurement methods and evaluation methods will be described later.

Example 1

(Preparation of Expanded Beads)

An extruder was used in which a die for forming a multilayer strand was attached to the outlet side of an extruder for forming an expanded core layer having an inner diameter of 65 mm and an extruder for forming an outer covering layer having an inner diameter of 30 mm. Then, a thermoplastic resin (polypropylene-based resin, melting point: 142 °C, a flexural modulus of 950 MPa) for forming a core layer and a polypropylene-based resin (melting point: 132 °C) for forming a covering layer were supplied to each extruder, melted and kneaded to obtain molten kneaded products. Note that, zinc borate was added as a cell controlling agent to a resin constituting the core layer. The cell controlling agent was added by preparing a master batch in which the resin constituting the core layer was used as the base material resin and supplying the master batch to an extruder for forming the core layer. The content of zinc borate in the resin was adjusted to 1000 ppm by weight. The two types of molten kneaded products obtained as described above were introduced into the die for forming the multilayer strand, the two types of molten kneaded products were joined in the die, and the molten kneaded products joined was extruded as a cylindrical strand from a small hole of a spinneret attached to a tip of the die (weight % of non-expanded core layer:weight % of covering layer=90:10). The inner diameter of the die used is shown in the table. The extruded strand was cooled with water, cut with a pelletizer, and dried to obtain multilayer resin particles having a cylindrical shape. The multilayer resin particle has a structure (a sheath core shape) in which a covering layer and a core layer in a non-expanded state are laminated, and has a through hole inside the core layer. Note that, the sheath core shape is a shape in which cylindrical resin particles made of the resin for forming the expanded core layer are used as a core, and a sheath formed by covering the resin for forming the covering layer on a peripheral surface of the core.

800 g of the multilayer resin particles prepared as described above and 3 L of water as a dispersion medium were put in a sealed vessel having a volume of 5 L. At this time, 0.3 parts by weight of kaolin as a dispersant, 0.4 parts by weight (as an active ingredient) of a surfactant (trade name: NEOGEN (trademark), manufactured by DKS Co., Ltd., sodium alkylbenzene sulfonate) and 0.01 parts by weight of aluminum sulfate were added to 100 parts by weight of the multilayer resin particles in a sealed vessel, respectively. Subsequently, carbon dioxide (3.4 MPa) as a blowing agent was put into the sealed vessel under pressure. Then, while stirring contents in the sealed vessel, the contents were heated to a temperature 5 °C lower than the expanding temperature of 146.5 °C, and the temperature was held for 15 minutes to adjust high-temperature peak heat quantity. Thereafter, the contents were further heated to the expanding temperature, and the temperature was held again for 15 minutes to adjust equilibrium vapor pressure to 3.6 MPa (G). Thereafter, the contents in the sealed vessel were released together with water under atmospheric pressure. At this time, the core layer of the multilayer resin particles was expanded to form the expanded core layer, and the covering layer formed a covering layer covering the peripheral surface of the expanded core layer. In this way, multilayer thermoplastic resin expanded beads were prepared that have a bulk density of 27 kg/m$^3$, an average particle weight of 1.5 mg, an average pore diameter of through holes of 4 mm, an average wall thickness of 0.8 mm, and a ratio L/D=1 of an average length L to an average outer diameter D, and have through holes and a cylindrical shape.

(Preparation of Expanded Beads Molded Article)

The thermoplastic resin expanded beads obtained as described above were fed in a molding mold (400 mm in a longitudinal direction, 400 mm in a front-back direction and 300 mm in thickness). Note that, at this time, a cracking gap was opened in the thickness direction of the molding mold, and the mold was closed. The ratio of the amount of cracking (mm) to the thickness (300 mm) of the expanded beads molded article is shown in the table as the cracking rate (%).

The molding mold fed with the thermoplastic resin expanded beads as described above was clamped, and steam heated to form a core member made of the expanded beads molded article. Heating with steam was performed by supplying the steam into the mold for four seconds in a state in which drain valves of the molds on both sides were opened to perform preheating (an exhaust step), then performing one-side heating with a molding steam pressure of 0.14 MPa (G), further performing one-side heating from an opposite direction with a molding steam pressure of 0.20 MPa (G), and then performing main heating from both sides with a molding steam pressure described in the table. Note that, the pressure denoted by (G) is a gauge pressure, that is, a value of a pressure based on the atmospheric pressure. The steam pressure of the main heating is shown in the table. After completion of the heating, the pressure was released, water cooling was performed for one second, and air cooling was performed for 20 seconds to obtain a molded article. An expanded beads molded article aged at 75 °C for two hours and then slowly cooled for six hours was used as a core member.

The molded article density (kg/m$^3$), the average porosity Q (%), the porosity P (%) of the surface layer portion, and the airflow volume (L/min) of the core member thus obtained were measured as follows. Further, the ratio of the porosity P of the surface layer portion to the average porosity Q measured as described above (the porosity of the surface layer portion/the average porosity; P/Q) was obtained. The obtained values are all shown in the table.

<Molded Article Density>

The molded article density of the core member is determined by measuring the weight and external dimensions of the core member, and dividing the weight by the apparent volume calculated from the apparent dimensions.

<Average Porosity>

The apparent volume X (cm$^3$) and the true volume Y (cm$^3$) of the core member were determined, and the average porosity of the core member was calculated using the following formula (1).

[Mathematical formula 2]

$$\text{Porosity (\% by volume)}=[(X-Y)/X]\times 100 \quad (1)$$

Note that, the apparent volume X of the core member is a volume calculated from the external dimensions of an expanded molded article sample, and the true volume Y is a substantial volume excluding the void portions of the expanded molded article. The true volume Y was determined by measuring the volume of the increased amount of alcohol when the core member was submerged in alcohol.

Note that, the average porosity was measured by measuring 10 samples of 20 mm×20 mm×100 mm (excluding the surface skin portion of the expanded beads molded article) randomly selected and cut out from the core member (the expanded beads molded article), and calculating the porosity from the average.

<Porosity of Surface Layer Portion>

The porosity of the surface layer portion of the core member was measured as follows.

As for the surface side portion of the expanded beads molded article, a portion from a portion of 5 mm in the depth direction from the surface to a portion further up to 25 mm was cut out as a sample (20 mm×20 mm×100 mm), and the porosity of the portion was measured in a manner similar to the method for the average porosity described above.

<Airflow Volume>

The airflow volume of the core member was measured as follows. To start with, a surface portion (excluding a skin layer) was cut from the obtained thermoplastic resin expanded beads molded article into a disk shape having a diameter of 100 mm and a thickness of 20 mm, and the disk was used as a sample. In accordance with JIS K6400-7A method (a positive pressure system): 2012, this sample was set in a device for measuring the airflow volume assembled in an order of a regulator, a flow meter (on the inlet side), a pressure gauge (on the inlet side), a sample fixture, a pressure gauge (on the outlet side), and a flow meter (on the outlet side). Air of 0.6 MPa was blown into the sample set in the device from the inlet side, and the airflow volume was measured from the flow meter on the inlet side based on JIS K6400-7A method: 2012. Note that, the sample was measured in an open system.

<Area Measurement of Through Hole Portion, Void Portion, and Concave Portion>

The area measurement of the concave portions on the surface of the core member (the area measurement of the through hole portions and the area measurement of the void portions) was performed as follows.

In the area measurement of the concave portion, a rectangular region of 25 mm×25 mm randomly selected from a flat portion on the surface of the core member (the expanded beads molded article) was used as the observation region. The concave portion was identified as a space portion in a plane parallel to the surface of the core member at a portion of 0.5 mm in the depth direction from the surface of the core member. Specifically, the depth distribution was measured with an optical non-contact measuring machine (VR3200, manufactured by Keyence Corporation), and an enlarged photograph of the cross-sectional area of the portion of 0.5 mm deeper from the reference line in the depth direction was obtained. The enlarged photograph was converted into image data by a commercially available scanner device. Next, an image of the enlarged photograph converted into image data was subjected to the monotone processing to adjust the monotone image, and the void portion was displayed in black. Note that, the monotone processing was performed by using image analysis software (NS2K-Pro, manufactured by Nanosystem Corporation) for the enlarged photograph converted into image data. The area of the void portions was measured by calculating the area of the portion that is subjected to the monotone processing and expressed in black based on the image data. Further, the same operation as described above was performed except that the image of the enlarged photograph converted into image data was subjected to the monotone processing to adjust the monotone image, and the through hole portions were displayed in black, and the areas of the through hole portions were measured.

Note that, the area of the concave portions was measured by performing the above measurement on 10 observation regions selected as described above and obtaining an arithmetic mean of the values obtained in each observation region.

Specifically, the following items were measured and calculated in the area measurement of the concave portion.

Average Opening Area of Concave Portions

In the observation region, the total opening area t1 of the through hole portions, the total opening area t2 of the void portions and the total number of the through hole portions and the void portions were measured, and the average opening area of the concave portions was calculated by dividing the total opening area (t1+t2) by the total number.

Ratio of Total Opening Area T of Concave Portions to Surface Area

The total opening area of each of the through hole portions and the void portions in the observation region was measured, and the sum (t1+t2) was taken as the total opening area T of the concave portions. Then, the ratio of the total opening area T of the concave portions to the surface area of the observation region was calculated.

Total Opening Area t1 of Through Hole Portions/Total Opening Area T of Concave Portions The total opening area of each of the through hole portions and the void portions in the observation region was measured, and the sum (t1+t2) was taken as the total opening area T of the concave portions. Then, the ratio (t1/T) of the total opening area t1 of the through hole portions to the total opening area T of the concave portions was determined.

Ratio of Total Opening Area t1 of Through Hole Portions to Surface Area

The total opening area t1 of the through hole portions in the observation region was measured, and the ratio of the total opening area t1 of the through hole portions to the surface area of the observation region was calculated.

Average Opening Area of Through Hole Portions

The total opening area t1 of the through hole portions and the total number of the through hole portions in the observation region were measured, and the average opening area of the through hole portions was calculated by dividing the total opening area t1 by the total number.

Ratio of Total Number of Through Hole Portions Having Area in Predetermined Range The total number R1 of through hole portions and the area of each through hole portion in the observation region were measured. Then, the number of through hole portions having an area of more than 0 $mm^2$ and less than 1 $mm^2$, 1 $mm^2$ or more and less than 2 $mm^2$, and 2 $mm^2$ or more (r1, r2, and r3, respectively) was counted, and the ratios [(r1/R1)×100], [(r2/R1)×100], and [(r3/R1)×100] of the total number of through hole portions in each area range to the total number R1 were calculated.

Ratio of Total Opening Area of Void Portions to Surface Area

The total opening area t2 of the void portions in the observation region was measured, and the ratio of the total opening area t2 of the void portions to the surface area of the observation region was calculated.

Ratio of Total Number of Void Portions Having Area in Predetermined Range

The total number R2 of the void portions and the area of each void portion in the observation region were measured. Then, the number of void portions having an area of more than 0 $mm^2$ and less than 1 $mm^2$, 1 $mm^2$ or more and less than 2 $mm^2$, and 2 $mm^2$ or more (r4, r5, and r6, respectively) was counted, and the ratios [(r4/R2)×100], [(r5/R2)×100], and [(r6/R2)×100] of the total number of void portions in each area range to the total number R2 were calculated.

(Production of Laminate)

The core member obtained as described above was placed in a molding mold (cavity dimension of 500 mm×500 mm×500 mm) for molding polyurethane foam, a liquid raw material for polyurethane foam was fed in the remaining space, and steam was supplied to cause the raw material to expand. As a result, the polyurethane foam was laminated on the core member, and a laminate was obtained in which the core member and the polyurethane foam were laminated and integrated. Using this, a dimensional stability evaluation, a peeling test, and a practicality evaluation were performed as follows.

<Dimensional Stability Evaluation>

The length of a maximum length portion Z1 of the cavity of the molding mold for molding the polyurethane foam used for the production of the laminate and a corresponding portion Z2 corresponding to the maximum length portion Z1 of the obtained laminate were measured, respectively. Then, a numerical value obtained by subtracting the length of the maximum length portion Z1 from the length of the corresponding portion Z2 was evaluated as a dimensional change amount M. Note that, FIG. 4C is referred to for the maximum length portion Z1, the corresponding portion Z2, and the dimensional change amount M.

<Peeling Test>

The obtained laminate was cut into a size of 50 mm×50 mm×laminate thickness to prepare a sample. Note that, the region to be cut out was selected from a region where the core member and the urethane foam were laminated in the thickness direction. One surface (the surface on the urethane foam side) and the other surface (the surface on the core member side) of the sample were bonded to an SUS plate, respectively. PPK1000 (manufactured by CEMEDINE Co., Ltd.) was used as an adhesive. A tensile test was conducted with a universal testing machine (TENSILON testing machine) under an environment of 23 °C and 50% RH under a condition of a tensile speed of 10 mm/min, and a maximum load when the core member and the urethane foam were peeled off from each other was evaluated as the adhesive strength ($N/mm^2$).

<Practicality Evaluation>

The laminate obtained as described above was placed on a test stand with the surface on which the core member was exposed facing downward, and a load of 588 N was repeatedly applied to an upper surface (the urethane foam surface) 20 times with a φ 300 mm load element from above. Thereafter, the urethane foam was visually observed and evaluated as follows.

Good; There was no problem such as peeling of the urethane foam.

Bad; The urethane foam was displaced with respect to the core member.

Examples 2 and 3 and Comparative Examples 1 to 4

A core member and a laminate were prepared in the same manner as in Example 1 described above except that the production conditions were changed to those shown in Table 1, and the molded article density, the average porosity, the porosity of the surface layer portion, the airflow volume, the area of the through hole portion, and the area of the void portion of the core member (the expanded beads molded article) were adjusted to be the contents in Table 1, and Examples 2 and 3 and Comparative Examples 1, 2, and 4 were obtained.

Further, a core member and a laminate were prepared in the same manner as in Example 1 described above except that a polypropylene-based resin having a melting point of 142 °C and a flexural modulus of 1470 MPa was used as the thermoplastic resin constituting the core layer of the resin particles to be used; the production conditions were changed to those shown in Table 1; the molded article density, the average porosity, the porosity of the surface layer portion, the airflow volume, the area of the through hole portion, and the area of the void portion of the core member (the expanded beads molded article) were adjusted to be the contents in Table 1; and Comparative Example 3 was obtained.

For Examples 2 and 3 and Comparative Examples 1 to 4 obtained as described above, each measurement and evaluation performed using Example 1 were similarly performed, and the results are shown in Table 1.

TABLE 1

| | | | Example 1 | Example 2 | Example 3 | Comparative Example 1 | Comparative Example 2 | Comparative Example 3 | Comparative Example 4 |
|---|---|---|---|---|---|---|---|---|---|
| Production conditions | Die hole diameter (inner diameter) | φmm | 2.4 | 2.4 | 2.4 | 2.4 | 1.7 | 2.4 | 2.7 |
| | Cracking rate | % | 20% | 20% | 30% | 30% | 30% | 10% | 10% |
| | Molding steam pressure of main heating during production of laminated expanded article | MP a | 0.20 | 0.20 | 0.20 | 0.24 | 0.20 | 0.22 | 0.22 |
| Core member | Molded article density | $kg/m^3$ | 28 | 28 | 30 | 31 | 30 | 30 | 30 |
| | Average porosity Q | % | 17% | 17% | 13% | 7% | 5% | 23% | 32% |
| | Porosity P of surface layer portion | % | 17% | 18% | 15% | 9% | 7% | 26% | 30% |
| | Porosity P of surface layer portion/average porosity Q | | 1.0 | 1.1 | 1.1 | 1.2 | 1.5 | 1.1 | 0.9 |

TABLE 1-continued

| | | Example 1 | Example 2 | Example 3 | Comparative Example 1 | Comparative Example 2 | Comparative Example 3 | Comparative Example 4 |
|---|---|---|---|---|---|---|---|---|
| Airflow volume | L/min | 285.3 | 304 | 292 | 248.7 | 265.7 | 354.0 | 350.7 |
| Average opening area of concave portions | $mm^2$ | 1.7 | 1.8 | 1.6 | 1.4 | 0.4 | 2.2 | 4.9 |
| Ratio of total opening area T of concave portions to surface area | % | 26.6 | 28.0 | 22.5 | 19.2 | 17.7 | 26.4 | 24.6 |
| Total opening area t1 of through hole portions/total opening area T of concave portions | | 0.11 | 0.11 | 0.11 | 0.22 | 0.02 | 0.14 | 0.36 |
| Ratio of total opening area t1 of through hole portions to surface area | % | 3.0 | 3.0 | 2.5 | 4.2 | 0.4 | 3.7 | 8.8 |
| Average opening area of through hole portions | $mm^2$ | 14 | 16 | 15 | 19 | 2 | 16 | 39 |
| Ratio of the total number r1 of through hole portions of 0 to 1 $mm^2$; $(r1/R1) \times 100$ | % | 22 | 26 | 34 | 30 | 96 | 15 | 3 |
| Ratio of the total number r2 of through hole portions of 1 to 2 $mm^2$; $(r2/R1) \times 100$ | % | 47 | 27 | 30 | 51 | 4 | 24 | 11 |
| Ratio of the total number r3 of through hole portions of 2 $mm^2$ or more; $(r3/R1) \times 100$ | % | 31 | 47 | 36 | 19 | 0 | 61 | 86 |
| Ratio of total opening area of void portions to surface area | % | 23.6 | 25.0 | 20.0 | 15.0 | 17.2 | 22.8 | 15.8 |
| Ratio of the total number r4 of void portions of 0 to 1 $mm^2$; $(r4/R2) \times 100$ | % | 64 | 65 | 65 | 68 | 70 | 56 | 65 |
| Ratio of the total number r5 of void portions of 1 to 2 $mm^2$; $(r5/R2) \times 100$ | % | 7 | 5 | 10 | 13 | 7 | 10 | 8 |
| Ratio of the total number r6 of void portions of 2 $mm^2$ or more; $(r6/R2) \times 100$ | % | 29 | 30 | 25 | 19 | 23 | 34 | 27 |

TABLE 1-continued

| | | | Example 1 | Example 2 | Example 3 | Comparative Example 1 | Comparative Example 2 | Comparative Example 3 | Comparative Example 4 |
|---|---|---|---|---|---|---|---|---|---|
| Laminate | Dimensional stability evaluation | Dimensional change amount (mm) | 1.6 | 1.5 | 2.2 | 6.0 | 6.0 | 1.4 | 0.5 |
| | Peeling test | $N/mm^2$ | 185 | 190 | 168 | 75 | 40 | 220 | 250 |
| | Practicality evaluation | Evaluation | Good | Good | Good | Good | Good | Good | Good |

The above embodiment encompasses the following technical ideas.

(1) A core member used for a laminate in which polyurethane foam is laminated on the core member made of a thermoplastic resin expanded beads molded article, characterized in that the thermoplastic resin expanded beads molded article is a molded article in which expanded beads having through holes are mutually fused, an average porosity Q of the thermoplastic resin expanded beads molded article is 10% or more and 25% or less, on a surface of the thermoplastic resin expanded beads molded article, a ratio of a total opening area of through hole portions of the expanded beads to a surface area of the thermoplastic resin expanded beads molded article is 2% or more and 5% or less, an average opening area of through hole portions of the expanded beads is 5 $mm^2$ or more and 20 $mm^2$ or less, and the ratio [(r3/R1)×100] of a total number r3 of through hole portions having an opening area of 2 $mm^2$ or more to a total number R1 of through hole portions of the expanded beads is 60% or less.

(2) The core member according to (1), wherein a porosity P of the surface layer portion of the thermoplastic resin expanded beads molded article is 10% or more and 20% or less, and the ratio (P/Q) of the porosity P of the surface layer portion to the average porosity Q is 1.0 or more and 1.2 or less.

(3) The core member according to (1) or (2), wherein a molded article density of the thermoplastic resin expanded beads molded article is 15 $kg/m^3$ or more and 50 $kg/m^3$ or less.

(4) The core member according to any one of (1) to (3), wherein the expanded beads constituting the thermoplastic resin expanded beads molded article are multilayer expanded beads having an expanded core layer and a covering layer covering the expanded core layer.

(5) The core member according to (4), wherein a base material resin of the expanded core layer is a polypropylene-based resin having a flexural modulus of 1200 MPa or less.

REFERENCE SIGNS LIST

10 concave portion
12 void portion
14 through hole portion
20 expanded beads
22 through hole
24 expanded core layer
26 covering layer
100 thermoplastic resin expanded beads molded article
100C core member
200 observation region
300 molding mold
310 cavity
320 male mold
330 female mold
340 feeding port
350 cracking
400 laminate
410 thermoplastic resin expanded beads molded article
410C core member
420 polyurethane foam
d opening direction
S1, S2, S3 size
Z1 maximum length portion
Z2 corresponding portion

The invention claimed is:

1. A laminate comprising:

a core member being made of a thermoplastic resin expanded beads molded article; and a polyurethane foam being laminated on the core member, wherein the thermoplastic resin expanded beads molded article is a molded article in which expanded beads having through holes are mutually fused;

an average porosity of the thermoplastic resin expanded beads molded article is 13% or more and 17% or less; and on a surface of the thermoplastic resin expanded beads molded article, a ratio of a total opening area of through hole portions of the expanded beads to a surface area of the thermoplastic resin expanded beads molded article is 2% or more and 5% or less, an average opening area of through hole portions of the expanded beads is 14 $mm^2$ or more and 16 $mm^2$ or less, and the ratio of a total number of through hole portions having an opening area of 2 $mm^2$ or more to the total number of through hole portions of the expanded beads is 60% or less, and wherein a peeling test strength of the laminate is in a range of 168-190 $N/mm^2$.

2. The laminate according to claim 1, wherein a porosity of a surface layer portion of the thermoplastic resin expanded beads molded article is 10% or more and 20% or less, and a ratio of the porosity of the surface layer portion to the average porosity is 1.0 or more and 1.2 or less.

3. The laminate according to claim 1, wherein a molded article density of the thermoplastic resin expanded beads molded article is 15 $kg/m^3$ or more and 50 $kg/m^3$ or less.

4. The laminate according to claim 1, wherein the expanded beads constituting the thermoplastic resin expanded beads molded article are multilayer expanded beads having an expanded core layer and a covering layer covering the expanded core layer.

5. The laminate according to claim 4, wherein a base material resin of the expanded core layer is a polypropylene-based resin having a flexural modulus of 1200 MPa or less.

6. The laminate according to claim 1, wherein an airflow volume of the thermoplastic resin expanded beads molded article is 270 L/min or more and 330 L/min or less.

* * * * *